Patented Mar. 14, 1944

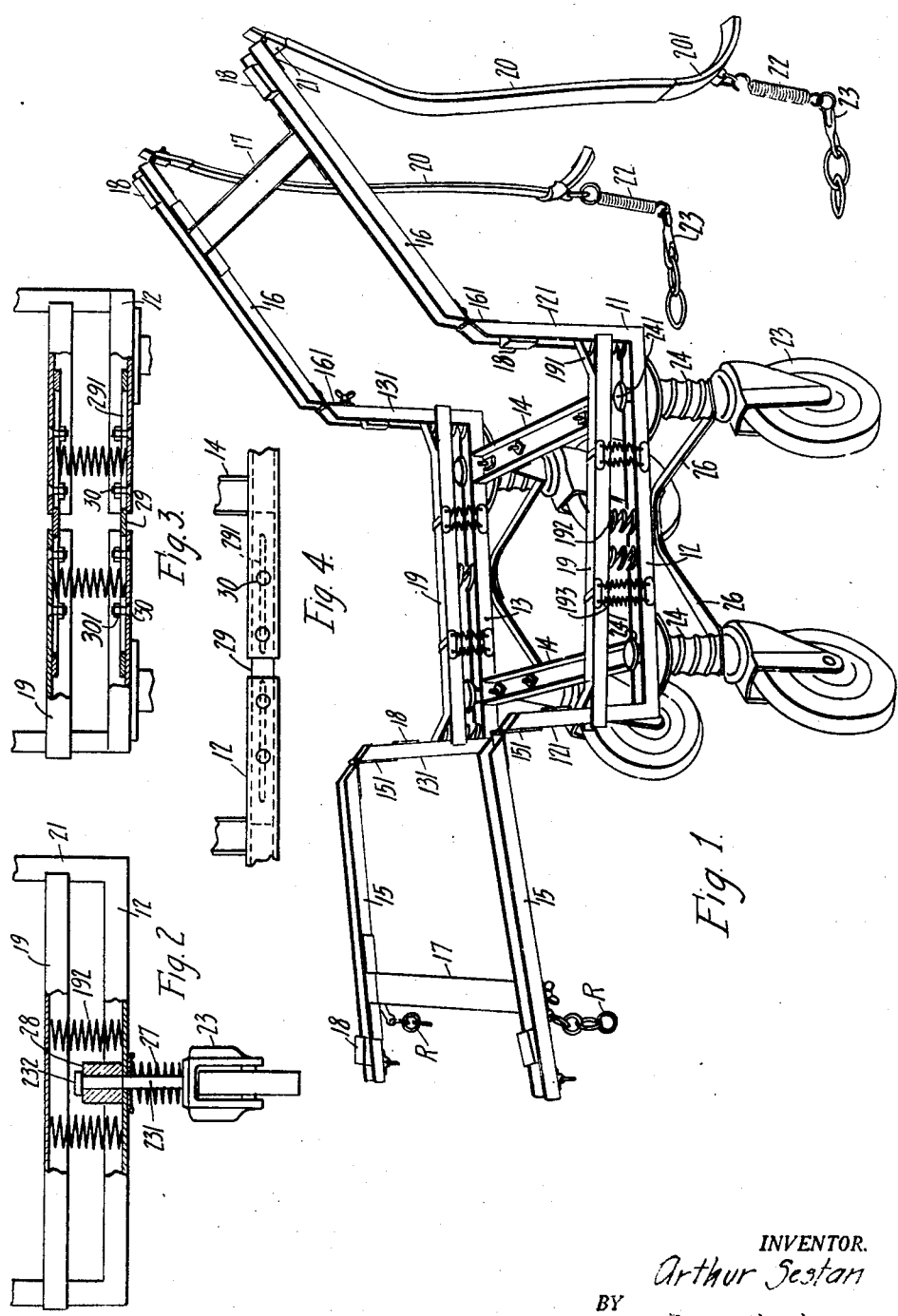

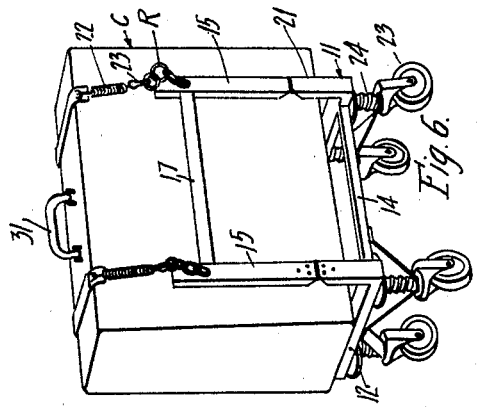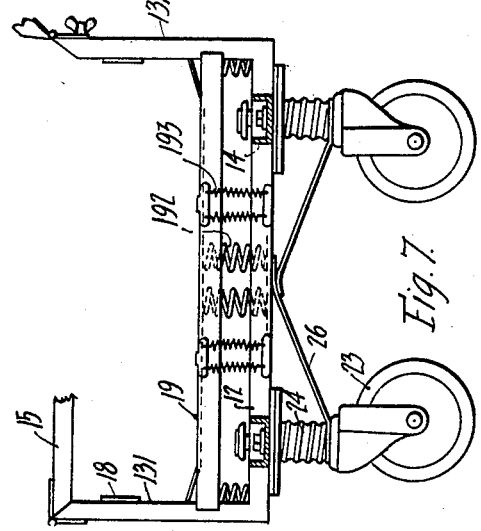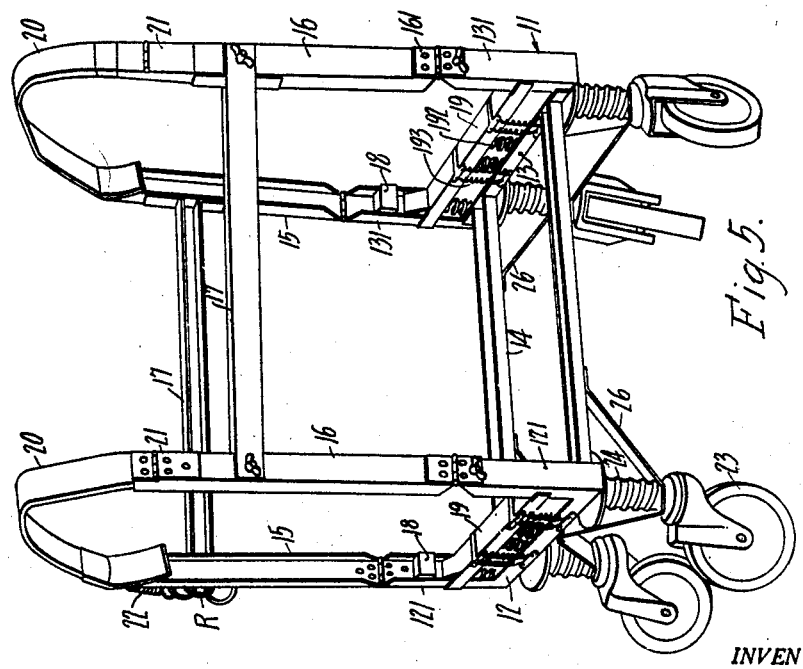

2,344,272

UNITED STATES PATENT OFFICE 2,344,272

GRIP OR CONTAINER VEHICLE

Arthur Sestan, Hoboken, N. J.

Application April 23, 1942, Serial No. 440,168

7 Claims. (Cl. 280—35)

This invention relates to a vehicle for carrying grips and/or other containers and as an object provides a device transported on its own vehicular structure propelled by means of the usual carrying handle.

Another object is to provide in such a device, means for adjustably carrying containers of various volume and size.

Still another object is the provision of means for absorbing shock in such a carriage portion, the provision of means for adjusting the size of the horizontal frame of the main chassis in such a carriage; the provision of novel means for fastening the container on the carriage.

These and other objects, features and advantages will appear from the drawings and description herewith.

In the drawings,

Fig. 1 is a perspective view of my device showing the side body members in open position and unloaded.

Fig. 2 is a fragmentary front end elevation view partly in section but showing the carriage having only one front wheel.

Fig. 3 is a front elevation fragmentary view partly in section, of the mounted end beams 19 and 12 as constructed for adjustable lengthening thereof.

Fig. 4 is a fragmentary plan view of the beams of Fig. 3.

Fig. 5 is a perspective view showing the side body members in closed position.

Fig. 6 is a perspective of the carriage when loaded with a container and showing adjustable snap fastening means.

Fig. 7 is a front elevation of the device of Fig. 1, partly in section, having non-adjustable beams and showing the longitudinal side frame beams mounted on the end frame beams.

The wheeled chassis 11, of Fig. 1, has a rectangular frame preferably of U shaped metal, having front end beam 12, rear end beam 13 and side beams 14. Members 12 and 13 have on each side and at right angles thereto, preferably integral extensions 121 and 131 and at the bevelled upper ends of the latter there are suitably fastened hinges 151, 161, to which are fastened pivotal right and left side uprights 15 and 16 respectively. A horizontal right and left side brace 17 is carried by members 15 and 16 as shown to provide an H-frame structure. Side rubber bumpers 18 are preferably set into the U frame at suitable points for obvious shock absorber purpose.

A self adjusting spring hung beam 19 may be mounted as shown on members 12 and 13 and having integral extending finger 191 at each end to ride in the channel track inherent in the U shaped upright extensions 121, 131. Member 19 is spring mounted on coil springs 192 resisting downward pressure. Springs 193 may be provided to yieldably hold said end beams 19 and 12 together A belt or the like 20 for fastening the container to the device, preferably has a hinge 21 at one end which in turn is removably fastened to the upper ends of members 16. At the free end 201, the belt preferably has fastened thereto a coil spring 22 in turn carrying a snap fastener fitting 23 for removable connection with one of a number of rings R, suitably fastened on the free ends of left uprights 15. The arrangement provides adjustable selective tie of container to the carriage as shown in Fig. 6. The spring beam 19 having springs 192, 193 cooperates with the belt fastener, as is seen, to facilitate said spring adjusted tie of container to carriage. Other fastening means may be used. A handle similar to member 31 may be mounted on the belt means.

The wheels 23 are preferably of caster type and set in housings 24 in turn mounted on members 12 and 13 by means of axle member 241. Suitable leaf springs 26 flexibly support the wheel mounts.

While a four wheel chassis is preferred, in Fig. 2 is shown, mount of a single preferably front wheel providing a three wheel vehicle. A coil spring 27 is provided around the shaft 231 between the caster 23 and beam 12 as shown to take up vertical shock. A nut 232 removably locks the shaft 231 to the beam 12. A suitable spacer 28 may be provided between the nut and beam.

At times, for obvious reasons, it is desired that the chassis beams 12, 13, 14 and 19 be adjustable lengthwise. In Figs. 3 and 4 a means is shown whereby the said frame members may be so adjusted. A connector 29 having slot or ports 291 receives bolts 30 therethru. When desired length of beam is attained to suit the container length the connector is rigidly fastened with the adjacent frame member by tightening the nut 301 on bolt 30 as is understood in the art.

As shown in Fig. 6 a travelling bag or the like C may be mounted on the chassis to snugly fit the sides of the frame and that from the foregoing varying sizes of bags and containers may be so mounted. The vehicle is propelled by means such as handle 31 of the bag or a handle mounted in other place such as on the belt means 20.

The sides 15, 16 may be closed inwardly as in Fig. 6 and the chassis carried as a portable device. Member 19 and its mounting means may be eliminated as in the embodiment shown in Fig. 6.

The disclosure is intended to be illustrative rather than limitative.

I claim:

1. In a portable vehicle, a wheeled chassis having a horizontally disposed rectangular frame, a plurality of housed caster wheels mounted thereon, spring means mounted on the frame engaged with said mounted wheel housings, side-upward-integral-channel-extensions on the four corners of the frame having a hinge on each upper extension end, right and left H-shaped frame sides each having lower ends respectively mounted on said right and left extension hinges, said right H-frame having a hinge on each of the other two ends, a tie member mounted on each latter hinge and having a coupling means on its free end removably engageable with, cooperative tie means on said left H-shaped frame upper end.

2. The device of claim 1 including horizontal front and rear beams on said rectangular frame having an extending tongue at each end, said tongue slidingly engaged in said channel extensions, said beams having springs seated on the frame to resist downward pressure on the beams.

3. The device of claim 1 including a rectangular frame having split beams and adjustable means on said beams to adjust the length and width of the frame comprising a link connector fastened on one end of said front and rear split beams having a number of ports selectively engageable with a bolt on the other section of the split beam.

4. The device of claim 1 including a rectangular frame having split beams and adjustable means on said beams to adjust the length of the beams comprising a link connector fastened on end of said beam and having a number of ports selectively engageable with a bolt on the other section of the split beam.

5. The device of claim 1 including yieldable means on the H-shaped upper side frame members for yieldably holding said side frame in spaced relation with articles carried on the vehicle.

6. In a portable vehicle, a wheeled chassis having a horizontally disposed rectangular frame, a plurality of housed caster wheels mounted thereon, spring means mounted on the frame engaged with said mounted wheel housings side-upward-integral-channel-extensions on the four corners of the frame having a hinge on each upper extension end, right and left H-shaped frame sides each having lower ends respectively mounted on said right and left extension hinges, said H-frames being foldable towards each other and means on said frames to hold same in said folded position said means comprising a tie member having a coupling on one H-frame removably engageable with cooperative tie means on the other H-frame.

7. In a portable vehicle, a wheeled chassis having a horizontally disposed rectangular frame, a plurality of housed caster wheels mounted thereon, spring means mounted on the frame engaged with said mounted wheel housings, side-upward-integral-channel-extensions on the four corners of the frame having a hinge on each upper extension end, right and left H-shaped frame sides each having lower ends respectively mounted on said right and left extension hinges, said right H-frame having a hinge on each of the other two ends; and means for holding an article in said vehicle said means comprising a tie member having a coupling on one H-frame removably engageable with cooperative tie means on the other H-frame.

ARTHUR SESTAN.